(12) United States Patent
Ikeda et al.

(10) Patent No.: US 11,574,397 B2
(45) Date of Patent: Feb. 7, 2023

(54) IMAGE PROCESSING DEVICE, IMAGE PROCESSING METHOD, AND COMPUTER READABLE RECORDING MEDIUM

(71) Applicant: OMRON Corporation, Kyoto (JP)

(72) Inventors: Yasuyuki Ikeda, Moriyama (JP); Masashi Kurita, Kizugawa (JP)

(73) Assignee: OMRON Corporation, Kyoto (JP)

( * ) Notice: Subject to any disclaimer, the term of this patent is extended or adjusted under 35 U.S.C. 154(b) by 134 days.

(21) Appl. No.: 17/269,526

(22) PCT Filed: Oct. 10, 2019

(86) PCT No.: PCT/JP2019/040047
§ 371 (c)(1),
(2) Date: Feb. 18, 2021

(87) PCT Pub. No.: WO2020/080250
PCT Pub. Date: Apr. 23, 2020

(65) Prior Publication Data
US 2021/0233231 A1    Jul. 29, 2021

(30) Foreign Application Priority Data
Oct. 15, 2018  (JP) .............................. JP2018-194010

(51) Int. Cl.
*G06T 7/00*  (2017.01)

(52) U.S. Cl.
CPC .. *G06T 7/0004* (2013.01); *G06T 2207/30164* (2013.01)

(58) Field of Classification Search
CPC ......... G06T 7/0004; G06T 2207/30164; G06T 2207/20081; G06T 2207/20084; G06T 2207/30108; G06T 7/11
See application file for complete search history.

(56) References Cited

U.S. PATENT DOCUMENTS 10,043,090 B2 *   8/2018   Tanaka ................... G06V 10/25
10,650,530 B2 *   5/2020   Hever ..................... G06T 7/174
(Continued)

FOREIGN PATENT DOCUMENTS

JP    2017146957    8/2017
JP    2017191608    10/2017
(Continued)

OTHER PUBLICATIONS

"International Search Report (Form PCT/ISA/210) of PCT/JP2019/040047," dated Dec. 24, 2019, with English translation thereof, pp. 1-2.
(Continued)

*Primary Examiner* — Bobbak Safaipour
(74) *Attorney, Agent, or Firm* — JCIPRNET (57) ABSTRACT

A convolutional neural network performs: a first masking process of masking a pixel region not to be inspected, by computing pixel values of corresponding pixels of an inspection image and of a mask image; an intermediate process for extracting a feature image from the inspection image that has been subjected to the first masking process; and a second masking process of masking the pixel region not to be inspected, by computing the pixel values of corresponding pixels of the inspection image that has been subjected to the intermediate process and of the mask image that has been subjected to a process identical to the intermediate process.

8 Claims, 6 Drawing Sheets

(56) References Cited

U.S. PATENT DOCUMENTS

| | | | | |
|---|---|---|---|---|
| 11,107,210 B2* | 8/2021 | Sakurai | ................ | G06T 5/009 |
| 2004/0032979 A1* | 2/2004 | Honda | ................ | G06T 7/0004 |
| | | | | 382/209 |
| 2006/0067570 A1* | 3/2006 | Onishi | ................ | G06T 7/001 |
| | | | | 382/147 |
| 2009/0175530 A1* | 7/2009 | Sjostrom | ............ | G06T 7/0004 |
| | | | | 382/152 |
| 2019/0147586 A1* | 5/2019 | Ikeda | ................ | G06T 7/0004 |
| | | | | 382/157 |
| 2021/0183037 A1* | 6/2021 | Kurita | ................ | G06T 5/50 |

FOREIGN PATENT DOCUMENTS

| | | |
|---|---|---|
| WO | 2018081537 | 5/2018 |
| WO | 2018106783 | 6/2018 |

OTHER PUBLICATIONS

"Written Opinion of the International Searching Authority (Form PCT/ISA/237) of PCT/JP2019/040047," dated Dec. 24, 2019, with English translation thereof, pp. 1-8.

"Search Report of Europe Counterpart Application", dated Jul. 6, 2022, p. 1-p. 8.

* cited by examiner

IMAGE PROCESSING DEVICE, IMAGE PROCESSING METHOD, AND COMPUTER READABLE RECORDING MEDIUM

CROSS-REFERENCE TO RELATED APPLICATION

This application is a 371 application of the International PCT application serial no. PCT/JP2019/040047, filed on Oct. 10, 2019, which claims the priority benefits of Japan Patent Application No. 2018-194010, filed on Oct. 15, 2018. The entirety of each of the above-mentioned patent applications is hereby incorporated by reference herein and made a part of this specification.

TECHNICAL FIELD

The present invention relates to an image processing device, an image processing method, and a computer readable recording medium.

BACKGROUND ART

In the field of factory automation, automatic control using an image measurement process has been widely put into practical use. For example, a process of inspecting the quality of an inspection object such as a workpiece by capturing an image of the workpiece and extracting a feature image such as a defect from an inspection image obtained by the image capturing has been put into practical use. As an example of such an image measurement process, a method of extracting a feature image using a convolutional neural network is known. In a convolutional neural network, local features are combined by repeatedly performing a convolution process and a pooling process on an image to extract the overall features. Therefore, in a case where a foreign matter is reflected in a portion of an inspection image, the feature of the foreign matter is extracted, and the feature of the foreign matter has an influence on a wide range of the image during repeated performance of a convolution process and a pooling process on the image. Such an influence can cause false detection. As a method for avoiding such false detection, for example, Japanese Patent Laid-Open No. 2017-146957 proposes a method of extracting a feature image by masking a pixel region not to be inspected out of pixel regions of an inspection image and inputting the masked inspection image to a convolutional neural network.

CITATION LIST

Patent Literature

[Patent Literature 1]
Japanese Patent Laid-Open No. 2017-146957

SUMMARY OF INVENTION

Technical Problem

However, in a case where the masked inspection image is input to the convolutional neural network, the feature of a boundary between a pixel region to be inspected and a pixel region not to be inspected (for example, a borderline between the shades of pixel values) is extracted, and such a feature can also cause false detection similarly to the feature of the foreign matter.

Consequently, in order to solve such a problem, an objective of the present invention is to propose an image processing device, an image processing method, and a computer readable recording medium that make it possible to suppress the extraction of a feature of a boundary between a pixel region to be inspected and a pixel region not to be inspected.

Solution to Problem

In order to solve the above problem, according to the present invention, there is provided an image processing device including: a means for performing a first masking process of masking a pixel region not to be inspected by computing pixel values of corresponding pixels of an inspection image including a pixel region to be inspected and the pixel region not to be inspected and a mask image including a pixel region that has a pixel value for masking the pixel region not to be inspected and that is associated with the pixel region not to be inspected; a means for performing an intermediate process for extracting a feature image from the inspection image on which the first masking process has been performed through a convolutional neural network; a means for performing the same process as the intermediate process on the mask image; and a means for performing a second masking process of masking the pixel region not to be inspected by computing pixel values of corresponding pixels of the inspection image on which the intermediate process has been performed and the mask image on which the same process as the intermediate process has been performed. According to such a configuration, it is possible to suppress the extraction of a feature of a boundary between the pixel region to be inspected and the pixel region not to be inspected.

The means for performing the second masking process may perform the second masking process on the inspection image after a first intermediate process and before a second intermediate process. In performing the second masking process at a stage where the number of intermediate processes performed on the inspection image is small, the effect of suppressing the extraction of a feature of a boundary between the pixel region to be inspected and the pixel region not to be inspected is higher than in performing the second masking process at a stage where the number of intermediate processes performed on the inspection image is large. Once a feature of a boundary between the pixel region to be inspected and the pixel region not to be inspected is extracted, the feature propagates throughout the entire image every time a subsequent intermediate process (for example, a convolution process) is executed. As the second masking process is performed at a stage where the number of convolution processes is as small as possible, the propagation of the feature of a boundary between the pixel region to be inspected and the pixel region not to be inspected decreases.

The means for performing the second masking process may perform the second masking process on the inspection image after each intermediate process. Thereby, it is possible to more reliably suppress the extraction of a feature of a boundary between the pixel region to be inspected and the pixel region not to be inspected.

The image processing device related to the present invention may further include a means for automatically generating the mask image for specifying a position, shape, and size of the pixel region to be inspected. Thereby, it is possible to appropriately set the pixel region to be inspected in consideration of the position, shape, size, number, distribution, and the like of a foreign matter on the inspection image.

A shape of the pixel region to be inspected may be non-rectangular. Thereby, it is possible to increase the degree of freedom of the setting of the pixel region to be inspected.

The image processing device related to the present invention may further include a display device that superimposedly displays a mark indicating the position, shape, and size of the pixel region to be inspected on the inspection image or superimposedly displays the mark on an inspection result image in which the feature image is extracted from the inspection image. Thereby, an operator can visually ascertain the position, shape, and size of the pixel region to be inspected.

According to the present invention, there is provided an image processing method including causing a computer system to execute: a step of performing a first masking process of masking a pixel region not to be inspected by computing pixel values of corresponding pixels of an inspection image including a pixel region to be inspected and the pixel region not to be inspected and a mask image including a pixel region that has a pixel value for masking the pixel region not to be inspected and that is associated with the pixel region not to be inspected; a step of performing an intermediate process for extracting a feature image from the inspection image on which the first masking process has been performed through a convolutional neural network; a step of performing the same process as the intermediate process on the mask image; and a step of performing a second masking process of masking the pixel region not to be inspected by computing pixel values of corresponding pixels of the inspection image on which the intermediate process has been performed and the mask image on which the same process as the intermediate process has been performed. According to such a method, it is possible to suppress the extraction of a feature of a boundary between the pixel region to be inspected and the pixel region not to be inspected.

According to the present invention, there is provided a computer readable recording medium, storing an image processing program, causing a computer system to execute: a step of performing a first masking process of masking a pixel region not to be inspected by computing pixel values of corresponding pixels of an inspection image including a pixel region to be inspected and the pixel region not to be inspected and a mask image including a pixel region that has a pixel value for masking the pixel region not to be inspected and that is associated with the pixel region not to be inspected; a step of performing an intermediate process for extracting a feature image from the inspection image on which the first masking process has been performed through a convolutional neural network; a step of performing the same process as the intermediate process on the mask image; and a step of performing a second masking process of masking the pixel region not to be inspected by computing pixel values of corresponding pixels of the inspection image on which the intermediate process has been performed and the mask image on which the same process as the intermediate process has been performed. According to such a recording medium, it is possible to suppress the extraction of a feature of a boundary between the pixel region to be inspected and the pixel region not to be inspected.

Advantageous Effects of Invention

According to the present invention, it is possible to suppress the extraction of a feature of a boundary between the pixel region to be inspected and the pixel region not to be inspected.

DESCRIPTION OF EMBODIMENTS

Hereinafter, an embodiment related to an aspect of the present invention will be described with reference to the accompanying drawings. The embodiment of the present invention is intended to facilitate understanding of the present invention, and is not to be construed as limiting the present invention. The present invention can be changed or modified without departing from the spirit or scope of the invention, and also includes equivalents. Meanwhile, the same reference numerals and signs indicate the same components, and description thereof will not be repeated.

Application Example

First, an application example of the present invention will be described with reference to FIGS. 1 to 5.

Figure 1:
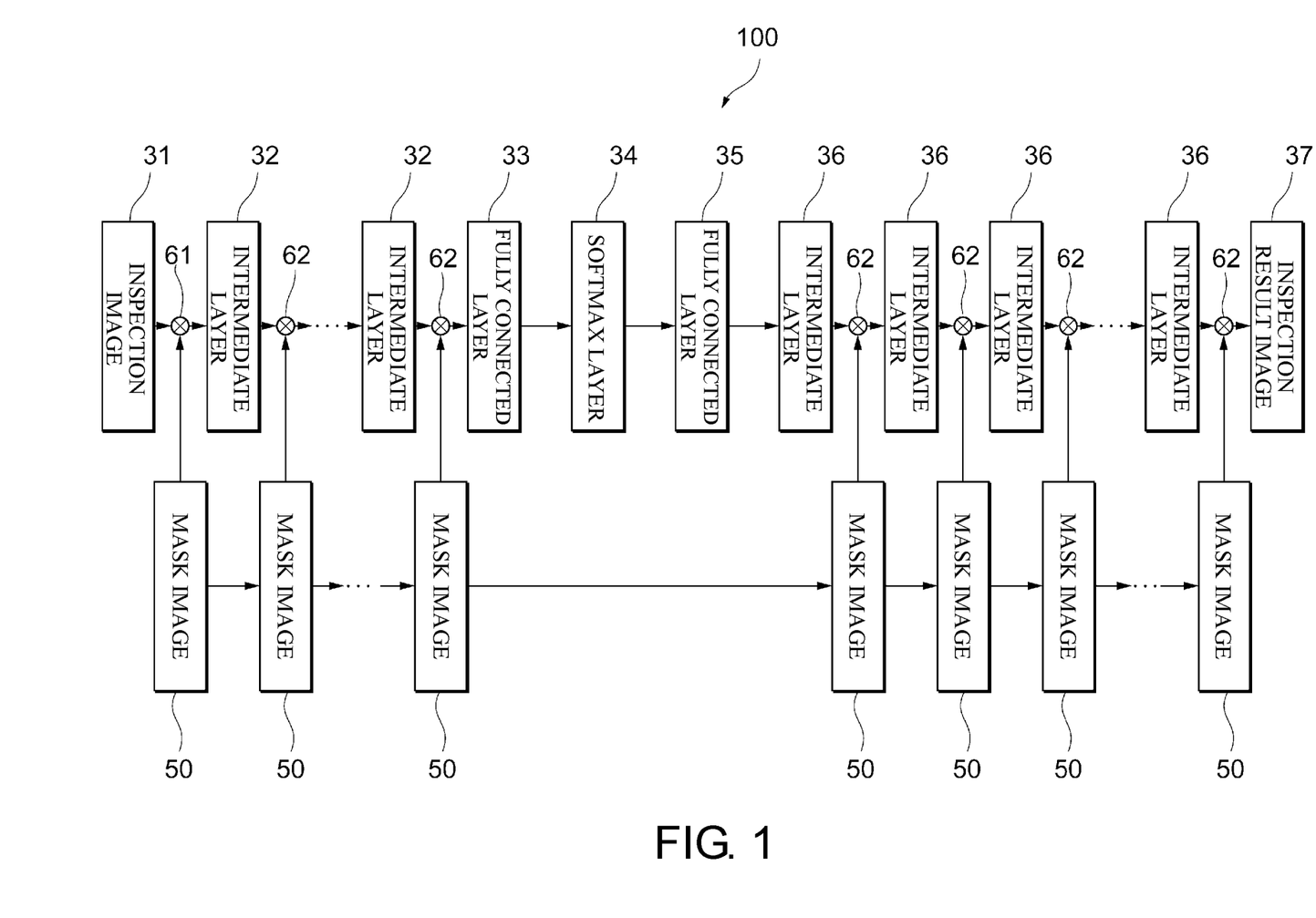
FIG. 1 is a diagram illustrating a flow of image processing related to the present embodiment.
Figure 2:
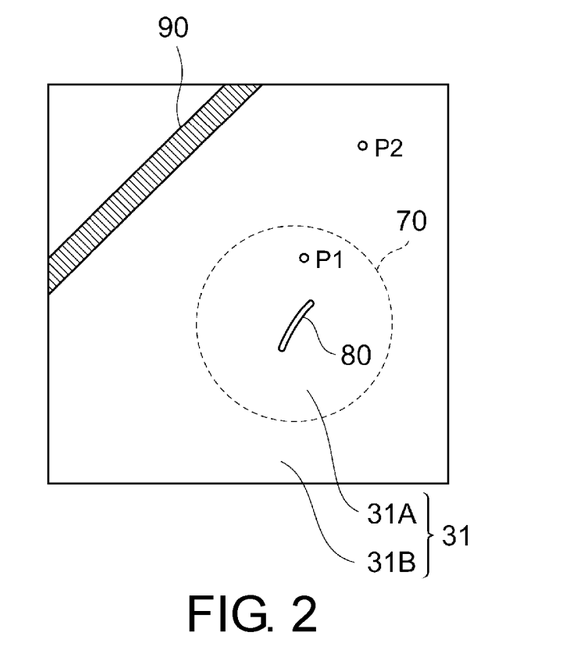
FIG. 2 is a diagram illustrating an example of an inspection image related to the present embodiment.
Figure 3:
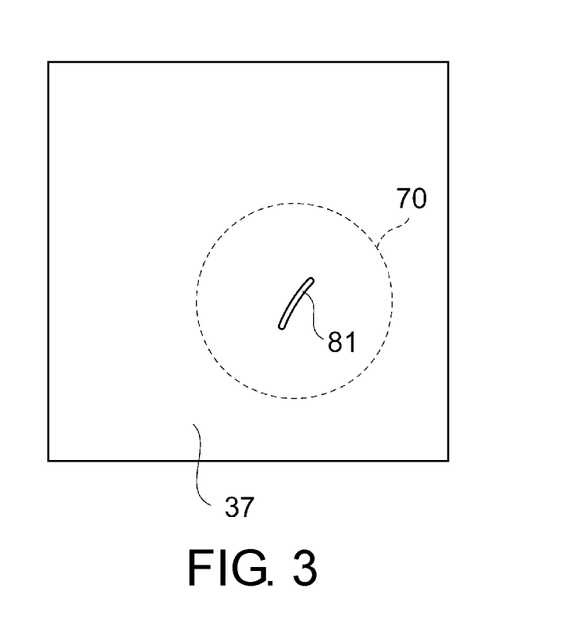
FIG. 3 is a diagram illustrating an example of an inspection result image related to the present embodiment.

FIG. 1 is a diagram illustrating a flow of image processing related to the present embodiment. A convolutional neural network 100 extracts a feature image such as a defect from an inspection image 31 that is an inspection object and outputs an inspection result image 37. The inspection object is, for example, a workpiece such as a product in process or a part, and the inspection image 31 is image data obtained by capturing an image of the inspection object. FIG. 2 is a diagram illustrating an example of the inspection image 31. A defect 80 and a foreign matter 90 are reflected in the inspection image 31. FIG. 3 is a diagram illustrating an example of the inspection result image 37. A feature image 81 of the defect 80 is extracted in the inspection result image 37.

The convolutional neural network 100 calculates a probability value that an image of the defect 80 included in the inspection image 31 belongs to any of a plurality of learned classes, and outputs the inspection result image 37 from which the feature image 81 of the defect 80 corresponding to a specific class selected by an operator among a plurality of classes is extracted. Examples of the class include a combination of images (for example, "black point," "white point," "black line," and "white line") classified for each type of the defect 80 and a "background." The convolutional neural network 100 performs machine learning beforehand using data set for learning including image data for learning prepared for each class and teaching data (label), to thereby acquire in advance internal parameters for calculating a probability value that an image of the defect 80 included in the inspection image 31 belongs to any of a plurality of learned classes and internal parameters for outputting the inspection result image 37 from which the feature image 81 of the defect 80 corresponding to a specific class selected by an operator among a plurality of classes is extracted. Examples of the internal parameter include the configuration of the convolutional neural network 100 (for example, the number of layers, the number of neurons in each layer, a connection relationship between neurons, and an activation function of each neuron) and a hyper-parameter (information indicating a weight of connection between neurons and a threshold of each neuron). The class is not limited to the above-described example, and may include a plurality of classes classified from the viewpoint of the shape of the defect 80 or a plurality of classes classified from the viewpoint of the color density of the defect 80. Examples of the defect 80 include a scratch, a dent, a stain, and the like.

As shown in FIG. 2, the inspection image 31 includes a pixel region 31A to be inspected and a pixel region 31B not to be inspected. The position (coordinates), shape (contour), and size (area) of the pixel region 31A to be inspected is set so that the foreign matter 90 is not included in the pixel region 31A. For example, a computer system may perform image recognition on the position, shape, size, number, distribution, and the like of the foreign matter 90, and may automatically set the position, shape, and size of the pixel region 31A so that the foreign matter 90 is not included in the pixel region 31A. Alternatively, an operator may recognize the position, shape, size, number, distribution, and the like of the foreign matter 90, and may manually set the position, shape, and size of the pixel region 31A so that the foreign matter 90 is not included in the pixel region 31A. The reference numeral 70 represents a mark for displaying the position, shape, and size of the pixel region 31A set in this manner. By superimposedly displaying the mark 70 on the inspection image 31, an operator can visually ascertain the position, shape, and size of the pixel region 31A to be inspected. Meanwhile, as shown in FIG. 3, the mark 70 may be superimposedly displayed on the inspection result image 37.

Figure 4:
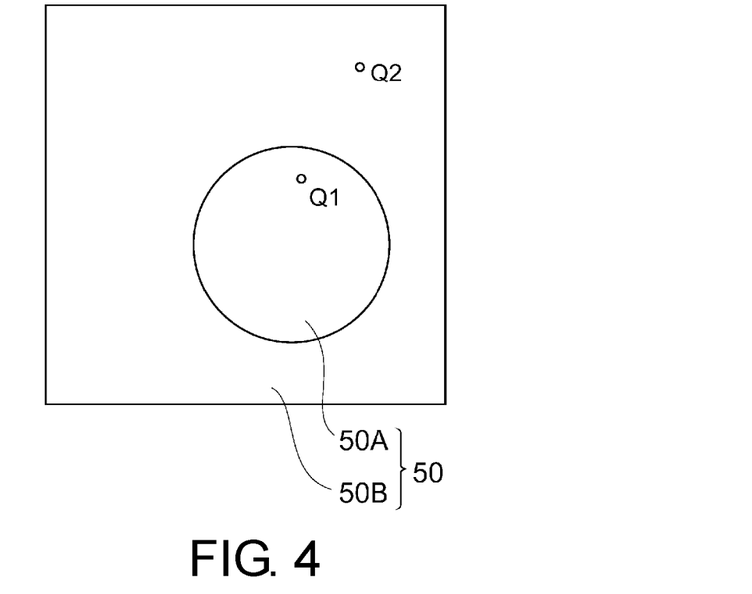
FIG. 4 is a diagram illustrating an example of a mask image related to the present embodiment.

FIG. 4 is a diagram illustrating an example of a mask image 50 that masks the pixel region 31B not to be inspected. In the present specification, excluding pixel information of the pixel region 31B not to be inspected from image processing (processing of extracting the feature image 81) based on the convolutional neural network 100 is referred to as "masking." The mask image 50 includes a pixel region 50A corresponding to the pixel region 31A to be inspected and a pixel region 50B corresponding to the pixel region 31B not to be inspected. The pixel region 50A has a pixel value (for example, "1") for extracting the feature image 81 without masking the pixel region 31A to be inspected. The pixel region 50B has a pixel value (for example, "0") for masking the pixel region 31B not to be inspected. In the present specification, masking the pixel region 31B not to be inspected by performing a computation process on pixel values of corresponding pixels of the inspection image 31 and the mask image 50 is referred to as a "masking process." Examples of the computation process used in such a masking process include a process of multiplying together pixel values of corresponding pixels of the inspection image 31 and the mask image 50. The pixel value of the pixel region 31B not to be inspected after the masking process is changed to, for example, the value of "0." In the example shown in FIGS. 2 and 4, since a pixel P1 located in the pixel region 31A to be inspected and a pixel Q1 located in the pixel region 50A of the mask image 50 have a corresponding positional relationship, the pixel value of the pixel P1 and the pixel value (for example, "1") of the pixel Q1 are multiplied together in the masking process. Similarly, since a pixel P2 located in the pixel region 31B not to be inspected and a pixel Q2 located in the pixel region 50B of the mask image 50 have a corresponding positional relationship, the pixel value of the pixel P2 and the pixel value (for example, "0") of the pixel Q2 are multiplied together in the masking process. Here, the wording "corresponding positional relationship" means that, for example, when a coordinate origin common to the inspection image 31 and the mask image 50 is set, the coordinate positions thereof are the same as each other.

Here, FIG. 1 will be described again. The convolutional neural network 100 performs the masking process of multiplying together corresponding pixel values of the inspection image 31 and the mask image 50 through a multiplier 61. The convolutional neural network 100 repeatedly performs a convolution process of applying a convolution filter to the inspection image 31 on which the masking process has been performed to extract a feature from the inspection image 31 and a pooling process of compressing the extracted feature. The convolutional neural network 100 may alternately perform the convolution process and the pooling process, or may set several convolution processes and one subsequent pooling process as one processing unit to repeatedly perform this processing unit multiple times. The reference numeral 32 represents an intermediate layer that collectively refers to a convolution layer or a pooling layer. A fully connected layer 33 calculates a weighted sum from a feature extracted through a plurality of intermediate layers 32, and outputs this calculated weighted sum to a softmax layer 34. The softmax layer 34 calculates a probability value that the feature extracted through a plurality of intermediate layers 32 belongs to any of a plurality of classes on the basis of the weighted sum which is output from the fully connected layer 33, and outputs this calculated probability value to a fully connected layer 35.

In the convolutional neural network 100, in order to extract the feature image 81 of the defect 80 corresponding to a specific class selected by an operator among a plurality of classes, the output value (probability value) of the softmax layer 34 relating to a feature image of defects corresponding to classes other than the specific class is set to zero. The convolutional neural network 100 applies a reverse convolution filter to an output from the fully connected layer 35 and repeatedly performs a reverse convolution process and a reverse pooling process, to thereby output the inspection result image 37 from which the feature image 81 has been extracted. The reference numeral 36 represents an intermediate layer that collectively refers to a reverse convolution layer or a reverse pooling layer.

In the present specification, the "convolution filter" and "reverse convolution filter" are collectively referred to as a "spatial filter." In addition, a process for applying the spatial filter to the inspection image 31 and extracting the feature image 81 from the inspection image 31 is referred to as an "intermediate process." Intermediate processes include the convolution process, the pooling process, the reverse convolution process, and the reverse pooling process described above. In such an intermediate process, a feature of a boundary between the pixel region 31A to be inspected and the pixel region 31B not to be inspected is extracted. For convenience of description, such a feature of a boundary is referred to as a "boundary feature." In the example shown in FIG. 1, every time a boundary feature is extracted in each intermediate process of the inspection image 31, in order to mask the boundary feature, the convolutional neural network 100 performs a masking process of multiplying together the pixel values of corresponding pixels of the inspection image 31 and the mask image 50 through a multiplier 62. In order to discriminate between the masking process using the multiplier 61 and the masking process using the multiplier 62, for convenience of description, the former is referred to as a "first masking process," and the latter is referred to as a "second masking process."

In the convolutional neural network 100, the same process as an intermediate process performed on the inspection image 31 after the first masking process is performed on the mask image 50, and then the second masking process is performed on the inspection image 31. The details of the second masking process will be described by taking, as an example, a case where a boundary feature extracted through an N-th intermediate process is masked. Here, when the total number of intermediate processes is defined as M, N is an integer equal to or greater than 1 and equal to or less than M, and M is an integer equal to or greater than 1. In the convolutional neural network 100, the spatial filter is applied to the inspection image 31 on which the first masking process has been performed and an intermediate process for extracting the feature image 81 from the inspection image 31 is performed N times. In the convolutional neural network 100, the same filter as the spatial filter applied to the inspection image 31 is applied to the mask image 50, and the same process as the intermediate process performed on the inspection image 31 is performed N times. In the convolutional neural network 100, the pixel values of corresponding pixels of the inspection image 31 on which the intermediate process has been performed N times and the mask image 50 on which the same process as the intermediate process has been performed N times are multiplied together. In this manner, the same process as the intermediate process performed on the inspection image 31 after the first masking process is performed on the mask image 50, and then the second masking process is performed on the inspection image 31, so that it is possible to mask the boundary feature extracted through the intermediate process. In the example shown in FIG. 1, the convolutional neural network 100 performs the second masking process on the inspection image 31 in all of N=1, 2, •••, M. In this manner, every time a boundary feature is extracted in each intermediate process, the extraction of the boundary feature can be suppressed more reliably by masking the boundary feature.

Meanwhile, in the convolution process, a computation process based on the following expression is performed.

[Expression 1]

$$I_{top}(X, Y, n) = \sum_{c=0}^{C-1}\sum_{y=0}^{K_y-1}\sum_{x=0}^{K_x-1} W(x, y, c, n) \cdot I_{btm}(X + x, Y + y, , c) + B(n)$$

In the above expression, $I_{btm}(X, Y, c)$ is an input image. In the convolution process of the inspection image 31, the inspection image 31 is used as an input image. In the convolution process of the mask image 50, the mask image 50 is used as an input image. $I_{top}(X, Y, c)$ is an output image obtained by performing the convolution process on an input image. $W(X, Y, c, n)$ is a convolution filter. A convolution filter used in the convolution process of the inspection image 31 and a convolution filter used in the convolution process of the mask image 50 are both the same. $B(n)$ is a bias, and c is the number of channels of an input image. Kx and Ky are the kernel sizes of the convolution filters. Meanwhile, in the convolution process of the mask image 50, the calculation may be performed by replacing all $W(X, Y, c, n)$ with "1" and replacing all $B(n)$ with "0."

Meanwhile, although an example in which a boundary feature is masked every time the boundary feature is extracted in each intermediate process has been described above, it is not always necessary to mask the boundary feature every time the boundary feature is extracted in each intermediate process. For example, in masking a boundary feature extracted at a stage where the number of intermediate processes performed on the inspection image 31 is small, the effect of suppressing the extraction of a feature of a boundary between the pixel region 31A to be inspected and the pixel region 31B not to be inspected is higher than in masking a boundary feature extracted at a stage where the number of intermediate processes performed on the inspection image 31 is large. Once a boundary feature is extracted, the boundary feature propagates throughout the entire image every time a subsequent intermediate process (for example, the convolution process) is executed. As the second masking process is performed at a stage where the number of convolution processes is as small as possible, the propagation of a boundary feature decreases. Therefore, in the convolutional neural network 100, the second masking process may be performed on the inspection image 31 after a first intermediate process and before a second intermediate process, and boundary features extracted by the second and subsequent intermediate processes may not be masked. Alternatively, in the convolutional neural network 100, boundary features extracted in any one or more of a plurality of intermediate layers 32 may be masked, and boundary features extracted in the remaining intermediate layers 32 and 36 may not be masked.

Figure 5:
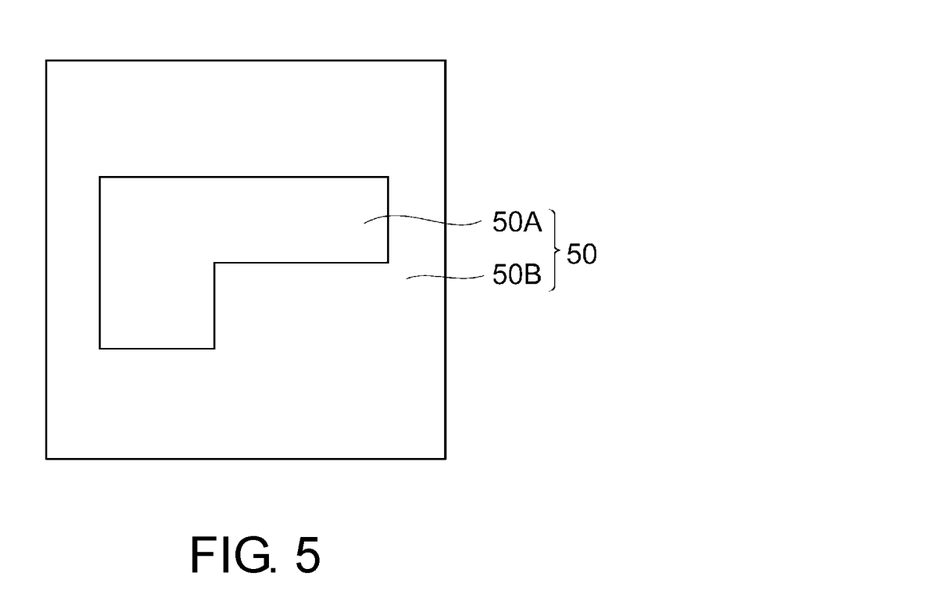
FIG. 5 is a diagram illustrating an example of the mask image related to the present embodiment.

In addition, as shown in FIG. 5, the shape of the pixel region 50A corresponding to the pixel region 31A to be inspected out of the pixel regions of the mask image 50 may be set to be non-rectangular. Thereby, it is possible to increase the degree of freedom of the setting of the pixel region 31A to be inspected. The non-rectangular shape can be any shape other than a rectangle (a square or a tetragon). The non-rectangular shape may be, for example, a polygon in which a plurality of rectangles is combined, or may be a circle, an ellipse, or the like. In addition, the entire pixel region of the inspection image 31 may be binarized, and the shape of the pixel region 50A of the mask image 50 may be set so that the collection of pixels having any one of binary values becomes the pixel region 31A to be inspected. Examples of such a binarization process include a process in which a pixel value of which any of luminance, chroma, or brightness is equal to or greater than a threshold is set to "1," and a pixel value less than the threshold is set to "0."

[Hardware Configuration]

Figure 6:
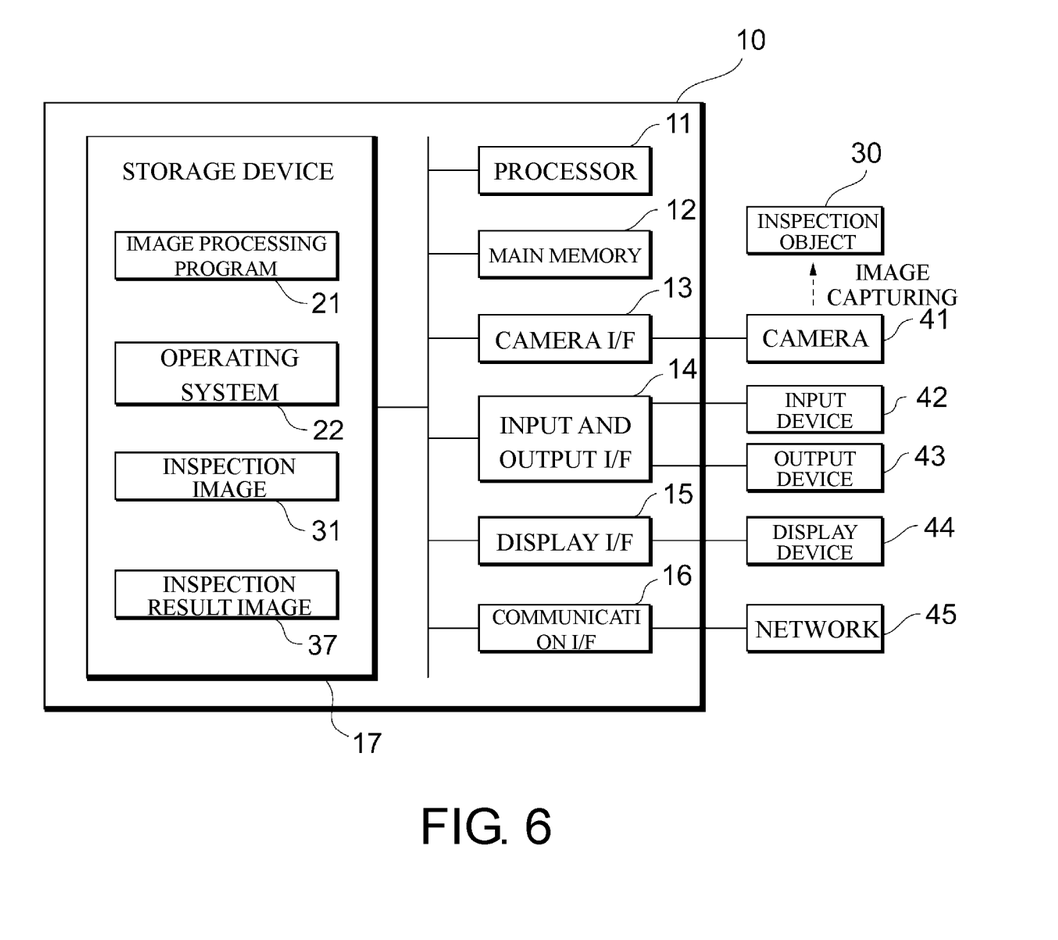
FIG. 6 is a diagram illustrating a hardware configuration of an image processing device related to the present embodiment.

Next, an example of a hardware configuration of an image processing device 10 related to the present embodiment will be described with reference to FIG. 6.

The image processing device 10 is a computer system including a processor 11, a main memory 12, a camera interface 13, an input and output interface 14, a display interface 15, a communication interface 16, and a storage device 17 as its hardware resources.

The storage device 17 is a computer readable recording medium such as a disk medium (for example, a magnetic recording medium or a magnetooptic recording medium) or a semiconductor memory (for example, a volatile memory or a non-volatile memory). Such a recording medium can also be referred to as, for example, a non-transitory recording medium. Software programs (an image processing program 21 and an operating system 22) are stored in the storage device 17. The image processing program 21 is a computer program for causing the processor 11 to execute an image processing method related to the present embodiment. These software programs are read from the storage device 17 to the main memory 12, and are construed and executed by the processor 11, so that the above-described image processing function based on the convolutional neural network 100 is realized. Meanwhile, the inspection image 31 and the inspection result image 37 are also stored in the storage device 17.

A camera 41 is connected to the camera interface 13. The camera 41 may be built into the image processing device 10, or may be externally attached to the image processing device 10. The camera 41 captures an image of an inspection object 30. The inspection object 30 may be, for example, a workpiece which is transported on a production line by a belt conveyor. The image processing device 10 may be installed on a production line, or may be installed at a location different from the production line. In a case where the image processing device 10 is installed at a location different from the production line, the image processing device 10 may receive the inspection image 31 obtained by image capturing of the inspection object 30 using a camera installed on the production line from a network 45 through the communication interface 16.

An input device 42 and an output device 43 are connected to the input and output interface 14. The input device 42 is a device that accepts an operator's input of various settings (such as, for example, settings of the mask image 50 or designation of a class). The input device 42 is a keyboard, a mouse, a touch pad, or the like. The output device 43 is a device that outputs a processing result of the image processing device 10 or the like. The output device 43 is, for example, a printer.

A display device 44 is connected to the display interface 15. The display device 44 displays a screen for various settings performed by an operator, or displays an inspection result of defect detection. For example, as shown in FIG. 2, the display device 44 can superimposedly display the mark 70 indicating the position, shape, and size of the pixel region 31A to be inspected on the inspection image 31. In addition, for example, as shown in FIG. 3, the display device 44 may superimposedly display the mark 70 on the inspection result image 37. The display device 44 is a display device such as, for example, a liquid crystal display.

[Image Processing Method]

Figure 7:
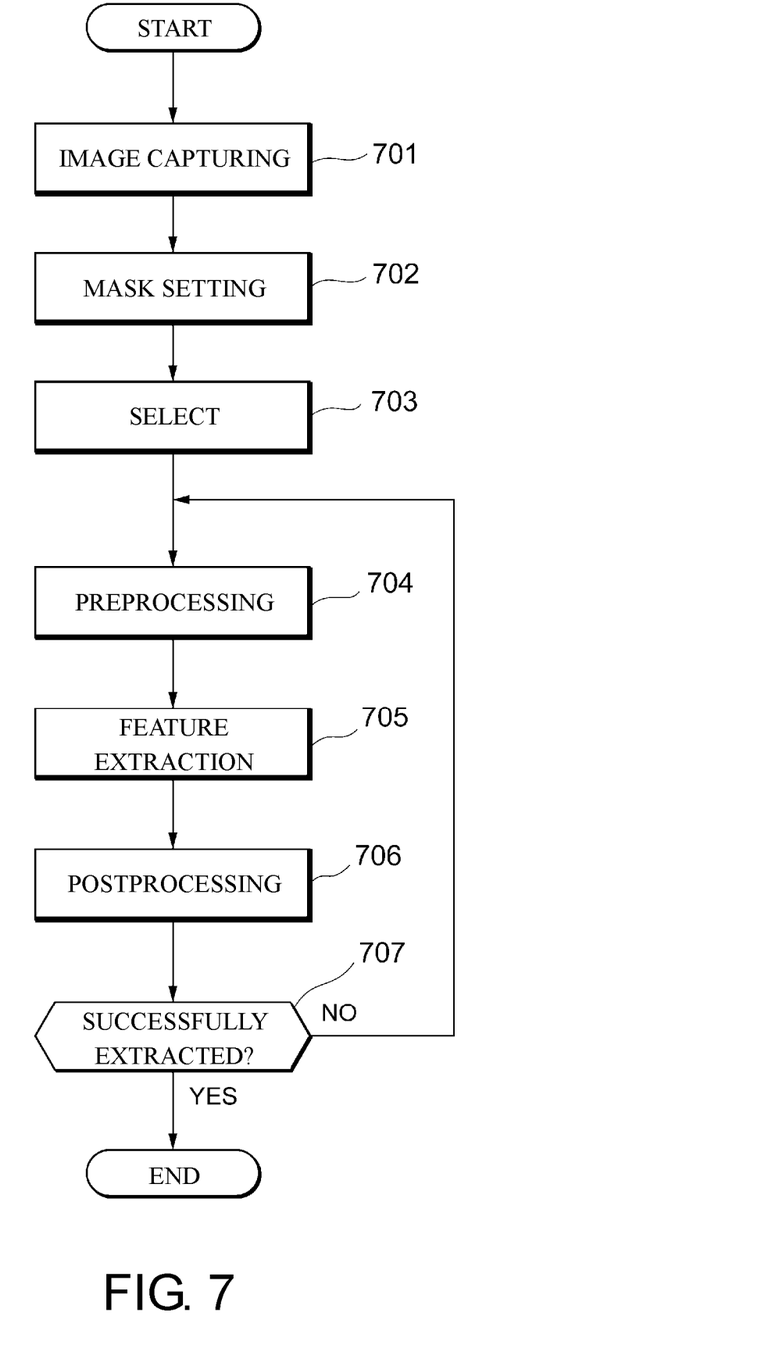
FIG. 7 is a flowchart illustrating a flow of an image processing method related to the present embodiment.

FIG. 7 is a flowchart illustrating an example of a flow of processing of an image processing method related to the present embodiment.

In step 701, the image processing device 10 captures an image of the inspection object 30 using the camera 41, and obtains the inspection image 31.

In step 702, the image processing device 10 performs a setting process on the mask image 50. In this setting process, the mask image 50 for specifying the position, shape, and size of the pixel region 31A to be inspected is generated. For example, as shown in FIG. 2, the image processing device 10 may perform image recognition on the position, shape, size, number, distribution, and the like of the foreign matter 90, and may automatically set the mask image 50 so that the foreign matter 90 is not included in the pixel region 31A. Alternatively, an operator may recognize the position, shape, size, number, distribution, and the like of the foreign matter 90, and may manually set the mask image 50 so that the foreign matter 90 is not included in the pixel region 31A.

In step 703, the image processing device 10 accepts the designation of a class corresponding to the defect 80 desired to be detected among a plurality of learned classes from an operator.

In step 704, the image processing device 10 performs preprocessing on the inspection image 31 in advance of image processing based on the convolutional neural network 100. This preprocessing is, for example, an enlargement process, a reduction process, a denoising process, or the like of the inspection image 31.

In step 705, the image processing device 10 extracts a feature of the defect 80 from the inspection image 31 through the image processing based on the convolutional neural network 100.

In step 706, the image processing device 10 performs postprocessing on the extracted feature, and outputs the inspection result image 37 from which the feature image 81 is extracted. This postprocessing is, for example, a binarization process based on the comparison of a pixel value with a threshold.

In step 707, the image processing device 10 determines whether the feature of the defect 80 has been successfully extracted. In a case where the defect 80 can be extracted as expected by an operator, it is determined that the feature of the defect 80 has been successfully extracted. The processes of steps 704 to 706 are repeatedly executed until the feature of the defect 80 is successfully extracted.

Meanwhile, it should be noted that the preprocessing of step 704 and the postprocessing of step 706 are not described in FIG. 1.

Figure 8:
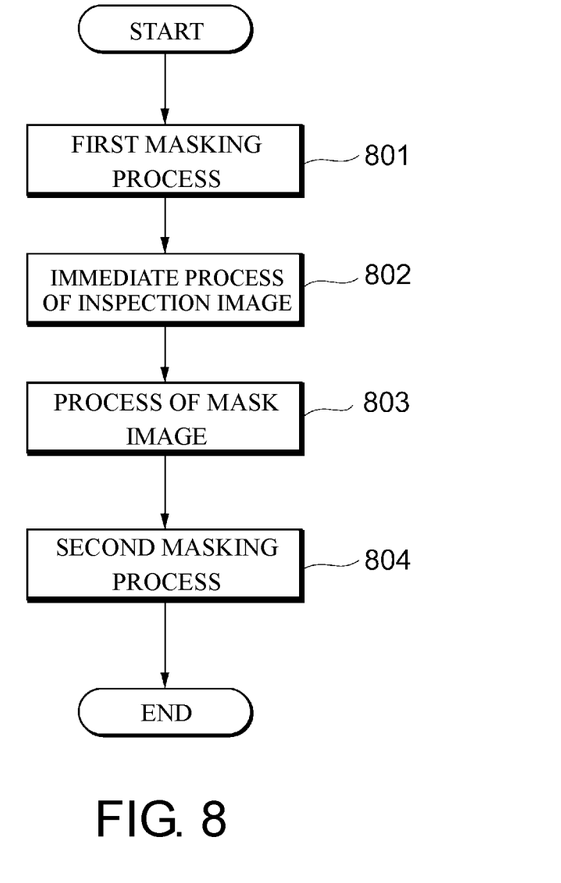
FIG. 8 is a flowchart illustrating of a flow of the image processing method related to the present embodiment.

FIG. 8 is a flowchart illustrating an example of a flow of image processing based on the convolutional neural network 100. This image processing is performed as the image processing function of the convolutional neural network 100 through the execution of the image processing program 21 performed by the processor 11, and is equivalent to the process of step 705 described above. The details of the image processing function of the convolutional neural network 100 are as described with reference to FIGS. 1 to 4. Here, in order to omit a repeated description, a brief description will be given.

In step 801, the image processing device 10 performs the first masking process of masking the pixel region 31B not to be inspected by computing the pixel values of corresponding pixels of the inspection image 31 including the pixel region 31A to be inspected and the pixel region 31B not to be inspected and the mask image 50 including the pixel region 50B that has a pixel value for masking the pixel region 31B not to be inspected and that is associated with the pixel region 31B not to be inspected.

In step 802, the image processing device 10 performs an intermediate process for extracting the feature image 81 from the inspection image 31 on which the first masking process has been performed through the convolutional neural network 100.

In step 803, the image processing device 10 performs the same process as the intermediate process on the mask image 50.

In step 804, the image processing device 10 performs the second masking process of masking the pixel region 31B not to be inspected by computing the pixel values of corresponding pixels of the inspection image 31 on which the intermediate process has been performed and the mask image 50 on which the same process as the intermediate process has been performed.

Meanwhile, the image processing function of the convolutional neural network 100 does not necessarily have to be realized by the hardware resources and the image processing program 21 of the image processing device 10 in cooperation, and may be realized using, for example, dedicated hardware resources (such as, for example, an application specific integrated circuit (ASIC) or a field-programmable gate array (FPGA)) of the image processing device 10.

A portion or the entirety of the embodiments described above may also be described as in the following additions, but there is no limitation thereto.

(Addition 1)

An image processing device 10 including:

a means 801 for performing a first masking process of masking a pixel region 31B not to be inspected by computing pixel values of corresponding pixels of an inspection image 31 including a pixel region 31A to be inspected and the pixel region 31B not to be inspected and a mask image 50 including a pixel region 50B that has a pixel value for masking the pixel region 31B not to be inspected and that is associated with the pixel region 31B not to be inspected;

a means 802 for performing an intermediate process for extracting a feature image 81 from the inspection image 31 on which the first masking process has been performed through a convolutional neural network 100;

a means 803 for performing the same process as the intermediate process on the mask image 50; and a means 804 for performing a second masking process of masking the pixel region 31B not to be inspected by computing pixel values of corresponding pixels of the inspection image 31 on which the intermediate process has been performed and the mask image 50 on which the same process as the intermediate process has been performed.

(Addition 2)

The image processing device 10 according to addition 1, wherein the means 804 for performing the second masking process performs the second masking process on the inspection image 31 after a first intermediate process and before a second intermediate process.

(Addition 3)

The image processing device 10 according to addition 1, wherein the means 804 for performing the second masking process performs the second masking process on the inspection image 31 after each intermediate process.

(Addition 4)

The image processing device 10 according to any one of additions 1 to 3, further including a means 702 for automatically generating the mask image 50 for specifying a position, shape, and size of the pixel region 31A to be inspected.

(Addition 5)

The image processing device 10 according to addition 4, wherein a shape of the pixel region 31A to be inspected is non-rectangular.

(Addition 6)

The image processing device 10 according to addition 4 or 5, further including a display device 44 that superimposedly displays a mark 70 indicating the position, shape, and size of the pixel region 31A to be inspected on the inspection image 31 or superimposedly displays the mark on an inspection result image 37 in which the feature image 81 is extracted from the inspection image 31.

(Addition 7)

An image processing method including causing a computer system to execute:

a step 801 of performing a first masking process of masking a pixel region 31B not to be inspected by computing pixel values of corresponding pixels of an inspection image 31 including a pixel region 31A to be inspected and the pixel region 31B not to be inspected and a mask image 50 including a pixel region 50B that has a pixel value for masking the pixel region 31B not to be inspected and that is associated with the pixel region 31B not to be inspected;

a step 802 of performing an intermediate process for extracting a feature image 81 from the inspection image 31 on which the first masking process has been performed through a convolutional neural network 100;

a step 803 of performing the same process as the intermediate process on the mask image 50; and a step 804 of performing a second masking process of masking the pixel region 31B not to be inspected by computing pixel values of corresponding pixels of the inspection image 31 on which the intermediate process has been performed and the mask image 50 on which the same process as the intermediate process has been performed.

(Addition 8)

A computer readable recording medium, storing an image processing program 21, causing a computer system to execute:

a step 801 of performing a first masking process of masking a pixel region 31B not to be inspected by computing pixel values of corresponding pixels of an inspection image 31 including a pixel region 31A to be inspected and the pixel region 31B not to be inspected and a mask image 50 including a pixel region 50B that has a pixel value for masking the pixel region 31B not to be inspected and that is associated with the pixel region 31B not to be inspected;

a step 802 of performing an intermediate process for extracting a feature image 81 from the inspection image 31 on which the first masking process has been performed through a convolutional neural network 100;

a step 803 of performing the same process as the intermediate process on the mask image 50; and a step 804 of performing a second masking process of masking the pixel region 31B not to be inspected by computing pixel values of corresponding pixels of the inspection image 31 on which the intermediate process has been performed and the mask image 50 on which the same process as the intermediate process has been performed.

The invention claimed is:

1. An image processing device comprising:
a processor, configured to:
perform a first masking process of masking a pixel region not to be inspected by computing pixel values of corresponding pixels of an inspection image including a pixel region to be inspected and the pixel region not to be inspected and a mask image including a pixel region that has a pixel value for masking the pixel region not to be inspected and that is associated with the pixel region not to be inspected;
perform an intermediate process for extracting a feature image from the inspection image on which the first masking process has been performed through a convolutional neural network;
perform the same process as the intermediate process on the mask image; and perform a second masking process of masking the pixel region not to be inspected by computing pixel values of corresponding pixels of the inspection image on which the intermediate process has been performed and the mask image on which the same process as the intermediate process has been performed.

2. The image processing device according to claim 1, wherein the processor performs the second masking process on the inspection image after a first intermediate process and before a second intermediate process.

3. The image processing device according to claim 1, wherein the processor performs the second masking process on the inspection image after each intermediate process.

4. The image processing device according to claim 1, wherein the processor is further configured to:
   automatically generate the mask image for specifying a position, shape, and size of the pixel region to be inspected.

5. The image processing device according to claim 4, wherein a shape of the pixel region to be inspected is non-rectangular.

6. The image processing device according to claim 4, further comprising a display device that superimposedly displays a mark indicating the position, shape, and size of the pixel region to be inspected on the inspection image or superimposedly displays the mark on an inspection result image in which the feature image is extracted from the inspection image.

7. An image processing method comprising causing a computer system to execute:
   a step of performing a first masking process of masking a pixel region not to be inspected by computing pixel values of corresponding pixels of an inspection image including a pixel region to be inspected and the pixel region not to be inspected and a mask image including a pixel region that has a pixel value for masking the pixel region not to be inspected and that is associated with the pixel region not to be inspected;
   a step of performing an intermediate process for extracting a feature image from the inspection image on which the first masking process has been performed through a convolutional neural network;
   a step of performing the same process as the intermediate process on the mask image; and
   a step of performing a second masking process of masking the pixel region not to be inspected by computing pixel values of corresponding pixels of the inspection image on which the intermediate process has been performed and the mask image on which the same process as the intermediate process has been performed.

8. A non-transitory computer readable recording medium, storing an image processing program, causing a computer system to execute:
   a step of performing a first masking process of masking a pixel region not to be inspected by computing pixel values of corresponding pixels of an inspection image including a pixel region to be inspected and the pixel region not to be inspected and a mask image including a pixel region that has a pixel value for masking the pixel region not to be inspected and that is associated with the pixel region not to be inspected;
   a step of performing an intermediate process for extracting a feature image from the inspection image on which the first masking process has been performed through a convolutional neural network;
   a step of performing the same process as the intermediate process on the mask image; and
   a step of performing a second masking process of masking the pixel region not to be inspected by computing pixel values of corresponding pixels of the inspection image on which the intermediate process has been performed and the mask image on which the same process as the intermediate process has been performed.

* * * * *